(12) United States Patent
Watadani et al.

(10) Patent No.: US 6,305,064 B1
(45) Date of Patent: Oct. 23, 2001

(54) RECLINING SEAT

(75) Inventors: Takeshi Watadani; Kunihisa Wakimoto; Makoto Fukuda; Noritaka Yamamoto, all of Okayama (JP)

(73) Assignee: Namba Press Works, Ltd., Kurashiki (JP)

(*) Notice: Subject to any disclaimer, the term of this patent is extended or adjusted under 35 U.S.C. 154(b) by 0 days.

(21) Appl. No.: 09/529,335

(22) PCT Filed: Jun. 2, 1999

(86) PCT No.: PCT/JP99/02949

§ 371 Date: Apr. 10, 2000

§ 102(e) Date: Apr. 10, 2000

(87) PCT Pub. No.: WO00/08974

PCT Pub. Date: Feb. 24, 2000

(30) Foreign Application Priority Data

Aug. 11, 1998 (JP) .................................. 10-226792

(51) Int. Cl.[7] ............................. B21D 39/03; B23P 11/00
(52) U.S. Cl. ................. 29/430; 29/434; 29/464; 29/281.5; 29/91.1
(58) Field of Search ........................ 29/430, 434, 464, 29/467, 468, 525.11, 559, 783, 787, 795, 824, 281.5, 91.1; 297/452.11, 452.18

(56) References Cited

U.S. PATENT DOCUMENTS

| 4,619,031 | * | 10/1986 | Loewe et al. ........................ 29/434 |
| 4,911,352 | * | 3/1990 | Urai et al. ........................ 297/346 |
| 4,934,036 | * | 6/1990 | Miyamoto ........................ 29/281.4 |
| 4,939,832 | * | 7/1990 | Satuka et al. ........................ 29/281.4 |
| 4,942,651 | * | 7/1990 | Miyamoto ........................ 29/91.5 |
| 5,287,610 | * | 2/1994 | Gomolak et al. ........................ 29/91.1 |
| 5,608,956 | * | 3/1997 | Seki ........................ 29/434 |
| 5,930,886 | * | 8/1999 | Jovan et al. ........................ 29/469 |
| 6,109,690 | * | 8/2000 | Wu et al. ........................ 297/216.13 |

* cited by examiner

Primary Examiner—David P. Bryant
Assistant Examiner—Jermie E. Cozart
(74) Attorney, Agent, or Firm—Renner, Kenner, Greive, Bobak, Taylor & Weber (57) ABSTRACT

A reclining seat having a U-shaped back frame of a seat back thereof and a base frame of a seat bottom thereof. End portions of the back frame are connected to connecting means provided in the base frame for connecting to the back frame so as to rotate the back frame with respect to the base frame. At least one of the connecting means has a rotating member provided for adjusting and fixing a tilt angle of the seat back with respect to the seat bottom. The rotating member has a shape corresponding to a circumference of the end portion and has means for temporarily attaching the back frame to the base frame, and the temporarily attaching means have a hook. The circumference of the end portion has an entrance for entering and receiving the hook. When the end portion of the back frame is connected to the connector of the base frame, the hook is entered and received in the entrance, and thereby, the back frame is temporarily attached to the base frame.

4 Claims, 6 Drawing Sheets

RECLINING SEAT

TECHNICAL FIELD

The present invention relates to a reclining seat and a manufacture thereof. In particular, the present invention relates to a jig usable for assembling the reclining seat in an automatic line production system and a method for manufacturing the reclining seat by use of such a jig. Also, the present invention relates to a reclining seat that can be assembled in an automatic line production system.

BACKGROUND OF THE ART

A seat of an automobile or a chair of an office (such a seat or chair is hereinafter simply written as a seat) is composed of a variety of components such as frames, cushion pads, and pad covers. In particular, a seat of an automobile further includes means for sliding the seat backward and forward to adjust its position, means for adjusting a tilt angle of a seat back of the seat and plastic parts for covering metallic parts to make look better.

For manufacturing a seat in a full automatic line production system, it is necessary to place and fix each component of the seat at a predetermined position. However, as described above, since a variety of relatively soft materials such as cushioning materials and plastic materials are used and those materials are easily deformed, it is difficult to place the components on a predetermined position. Thus, many hands are required for most of a seat assembling process, and as a matter of course, the cost is disadvantageously increased.

In addition, since positions for connecting each component are located at a variety of positions, a worker must do the connecting work with a forced posture, and thus, this matter makes the working conditions worse.

Moreover, there are seats having a variety of mechanical functions in accordance with its use. For example, its seat back can be tilted and its tilt angle can be adjusted, and the seat itself can be slid backward and forward to adjust its position. However, seats having such mechanical functions make much worse the problems described above.

Furthermore, the seat manufacturing process can be simplified and the number of the manufacturing steps can be reduced by use of common parts usable for a variety of seats and use of a jig when manufacturing the seat. However, even though all seat structures are identical and common parts usable for the seats are used, brackets for mounting the seat on a floor are not used as common parts if the seat is mounted on a different floor structure. In this case, it is required to provide a variety of jigs.

Therefore, the present invention is made in order to solve those problems, and an object of the present invention is to provide a seat and a method for manufacturing the seat in which the seat can be easily assembled.

Another object of the present invention is to provide a seat and a method for manufacturing the seat in which the seat can be easily assembled even though a cushion pad and the like which makes difficult the assembling work is attached to parts or members of the seat.

Still another object of the present invention is to provide a jig in which a seat can be easily assembled by use of the jig.

The other object of the present invention is to provide a jig in which the jig can be commonly used for a variety of seats.

SUMMARY OF THE INVENTION

A seat according to the present invention is a reclining seat having a U-shaped back frame of a seat back of the seat and a base frame for supporting the seat. Means for connecting the base frame to the back frame are provided in the base frame, and both end portions of the U-shaped back frame are connected to the connecting means of the base frame so as to pivotally rotate the back frame with respect to the base frame. At least one of the connecting means of the base frame has a rotating member provided for adjusting and fixing a tilt angle of the back frame. Thus, since the end portion of the back frame is connected to the connecting means of the base frame through the rotating member, the tilt angle of the seat back can be adjusted and fixed. The rotating member has a shape corresponding to a circumference of the end portion of the back frame and has means for temporarily attaching the back frame to the base frame. The temporarily attaching means have a hook for temporarily attaching the back frame to the base frame. The circumference of the end portion has an entrance for entering and receiving the hook.

If the end portion of the back frame is connected to the connecting means of the base frame, the hook of the base frame is then received in the entrance of the back frame so as to temporarily attach the back frame to the base frame.

Both connecting means of the base frame may be provided with such rotating members.

It is desirable that the entrance is provided by cutting a part of a flange provided along the circumference of the end portion to be connected to the rotating member. In addition, it is desirable that the temporarily attaching means are provided as one body with the rotating member.

A jig according to the present invention used for assembling a seat having a U-shaped back frame of its seat back, a bottom frame of its seat bottom and a base frame having brackets for mounting the seat on a floor consists of a plate having means for holding the base frame. If the base frame is held on the frame holding means, there is a distance between the plate and the base frame. An opening is provided in the plate and a position of the opening is matched to a connecting position of the bottom frame and the base frame so as to lift means for connecting those frames upward to the connecting position through the opening.

It is desirable that a hole for positioning the bottom frame to the base frame is provided in the bottom frame and a projection corresponding to the hole is provided on the plate of the jig.

The seat according to the present invention having the bottom frame of the seat bottom is assembled by use of the jig according to the present invention. A method for assembling the seat according to the present invention comprises the following steps. As a first step, the base frame is held on the frame holding means of the jig. The jig can be slid on a free flow conveyer type jig-transferring rail. As a second step, the hook of the rotating member of the base frame is entered and received in the entrance provided in the end portion of the back frame so as to temporarily attach the back frame to the base frame and to position the end portion of the back frame to the connecting means of the base frame. Then, those frames are transferred together with the jig to a position at which first frame connecting means are disposed, by sliding the jig on the transferring rail. As a third step, the first frame connecting means are approached to the connecting means of the base frame and the end portion of the back frame positioned to the connecting means, and those frames are connected by use of the first frame connecting means. Then, the back frame and the base frame are transferred together with the jig by sliding the jig on the transferring rail. As a fourth step, the bottom frame to which a cushion pad has been attached is positioned on the base frame, and the back frame, the base frame and the bottom frame are transferred together with the jig to a position at which second frame connecting means are disposed. The second frame connecting means are lifted upward through the opening of the jig so as to approach the second frame connecting means to a connecting position of the bottom frame and the base frame. Then, the bottom frame is connected to the base frame by use of the second frame connecting means.

BEST MODE FOR CARRYING OUT THE INVENTION

Figure 1:
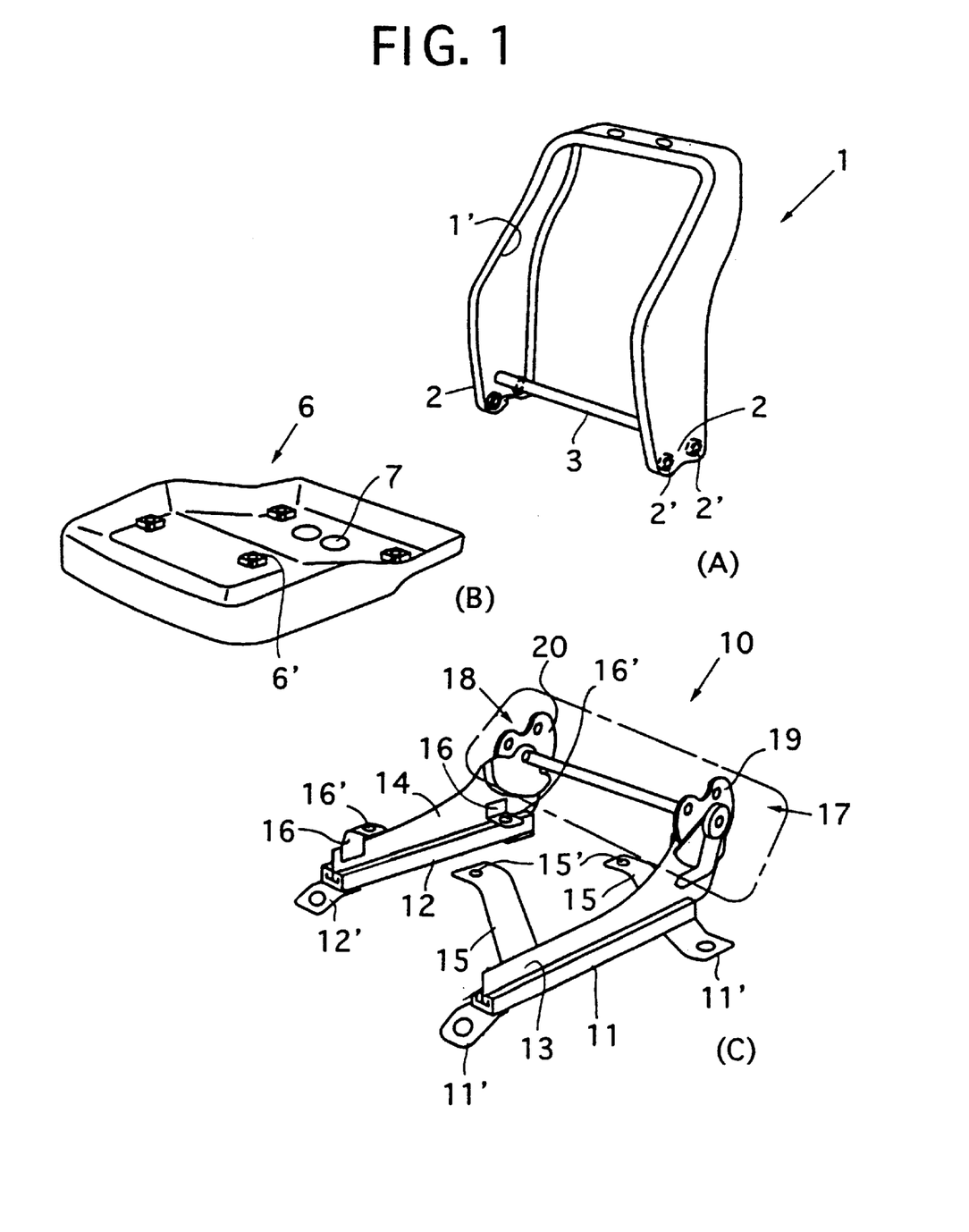
FIG. 1 is perspective views of a back frame, a bottom frame and a base frame of a seat according to the present invention, respectively.
Figure 2:
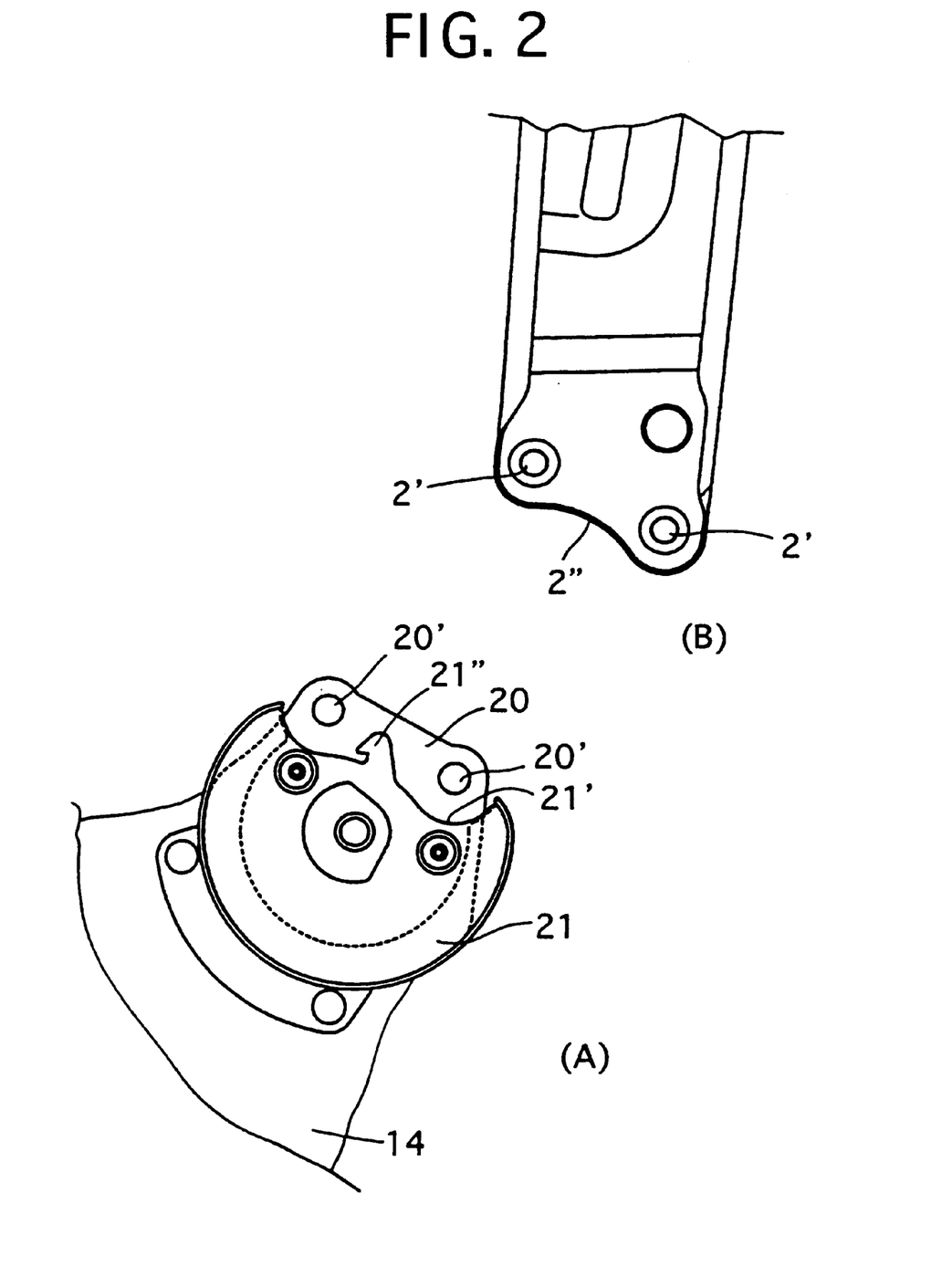
FIG.2 is enlarged partial views of a rotating member of a base frame structure and a connector portion of a back frame and shows a structure for temporarily attaching the back frame to the base frame structure.

With referring to FIGS. 1 and 2, a seat according to the present invention has a back frame 1 (FIG.1(A)), a bottom frame 6 (FIG.1(B)) and a base frame structure 10 (FIG. 1(C)).

The back frame 1 (FIG. 1(A)) is formed in U-shape, and flange 1 extended inward is formed along its circumference to ensure mainly its strength, and both end portions 2 of this U-shaped back frame 1 are bridged by a reinforcement bar 3. Also, those end portions 2 of the back frame 1 have holes 2 provided for connecting the back frame 1 to the base frame 10 through the holes 2 by use of bolt-nut means. Preferably, nuts are fixed on the back frame 1 so as to position their threaded holes on the holes 2. That is, the frames can be connected each other by simply screwing bolts through the holes as described later. Note that use of such a nut is not included in a main constitution of the present invention.

The bottom frame 6 (FIG. 1(B)) is a frame for supporting a cushion pad of a seat bottom and has a shape corresponding to an outline of a bottom part of the seat bottom. As well as the back frame 1 described above, holes 6 are provided in this bottom frame 6, and nuts are preferably fixed on this frame 6 so as to position their threaded holes on the holes 6. Those holes 6 are for connecting the bottom frame 6 to the base frame 10 by use of bolt-nut means, as described later. Also, holes 7 are provided in the bottom frame 8. Those holes 7 serve as a guide passage for positioning the bottom frame 6 when a jig is used as described later. In this embodiment, those holes 7 are preferably provided in the bottom frame 6 so as to pass through the bottom frame 6. Alternatively, instead of those holes 7, any means (for example, hollows) may be provided in the bottom frame 6 so as to perform the same function as those holes 7.

The base frame structure 10 (FIG. 1(C)) of this embodiment is a frame for mounting the seat on a floor of an automobile and the like and has a conventional mechanism for sliding the seat backward and forward. This mechanism consists of a lower member 11 (12) and an upper member 13 (14) placed in a straight guide channel provided in the lower member 11 (12).

Brackets 11' (12') are provided on the lower member 11 (12) to mount the seat on the floor. Note that shapes of the brackets 11' (12') may be changed in accordance with the floor structure and the surface structure, and this causes to prevent the generalization of the jig used for assembling a variety of seats.

In the upper member 13 (14), brackets 15 (16) are provided for connecting to the bottom frame 6. Those brackets 15 (16) have holes 15' (16') provided so as to position on the holes 6' of the bottom frame 6. The bottom frame 6 is positioned on the base frame structure 10 so as to position the holes 6' on the holes 15' (16'), and then, the back frame 6 is connected to the base frame structure 10 by screwing bolts through the holes 6', 15', 16' as described later.

Meanwhile, connecting means 17 (18) for connecting the back frame 1 to the base frame structure 10 are provided in a rear end portion of the upper member 13 (14). The connecting means 17 (18) include a rotating member 19 (20) of a reclining adjustor for adjusting and fixing a tilt angle of the seat back with respect to the seat bottom, and the back frame 1 is connected to the rotating members 18, 19. Note that such a reclining adjustor structure is substantially the same as that of the prior art.

An enlarged view of the rotating member 20 is shown in FIG.2A. As shown, holes 20' are provided in the rotating member 20 so as to position on the holes 2' provided in the end portion 2 of the back frame 1 when the back frame 1 is positioned to the base frame structure 10. That is, the back frame 1 is positioned so as to position the holes 2' on the holes 20', and then, bolts are screwed through those holes 2', 20', and thereby the back frame 1 can be connected to the upper member 14 (the base frame structure 10). However, usually, a cushion pad of a seat back has been attached to the back frame and a cushion pad of a seat bottom has been attached to the bottom frame before assembling a seat, and this matter makes the automatic assemble work difficult. That is, it is difficult to position those frames so as to position the holes of one frame on the holes of another frame by use of a mechanical production system. Thus, in the art, it must be done by use of hands to position the frames and to screw bolts through the holes.

In the present invention, a disc 21 for temporarily attaching the back frame 1 to the base frame structure 10 is advantageously rigidly fixed to the rotating member 20. The disc 21 has substantially the same shape as the rotating member 20, and a flange is formed along its circumference to ensure its strength.

An edge 21' having substantially the same shape as a lower part of the end portion 2 of the back frame 1 is formed along a part of a circumference of the disc 21, and a hook 21" projected outward is provided about the center of the edge 21'. Meanwhile, an entrance 2" for entering and receiving the hook 21" is provided in the flange of the lower end portion 2 of the back frame 1 (FIG. 2(B)).

The hook 21" of the disc 21 is entered through the entrance 2" and is hooked on the flange of the back frame 1, and thereby the back frame 1 is temporarily attached to the base frame structure 10. Since the edge 21' of the disc 21 has the same shape as the lower part of the end portion 2 of the back frame 1, the holes 2' of the back frame 1 is positioned on the holes 20" of the rotating member 20 (19) by temporarily attaching the back frame 1 to the base frame structure 10, and thus, the back frame 1 can be connected to the base frame structure 10 by simply screwing bolts through those holes. In this embodiment, the disc is preferably separated from the rotating member. Alternatively, the disc may be integrated together with the rotating member.

The bottom frame 6 is connected to the upper members of the base frame structure 10 by simply positioning the back frame 1 to the base frame structure 10 so as to position the holes of one frame on the holes of another frame and then screwing bolts through those holes. In this embodiment, such a connection is easily done by use of a jig described below.

Figure 3:
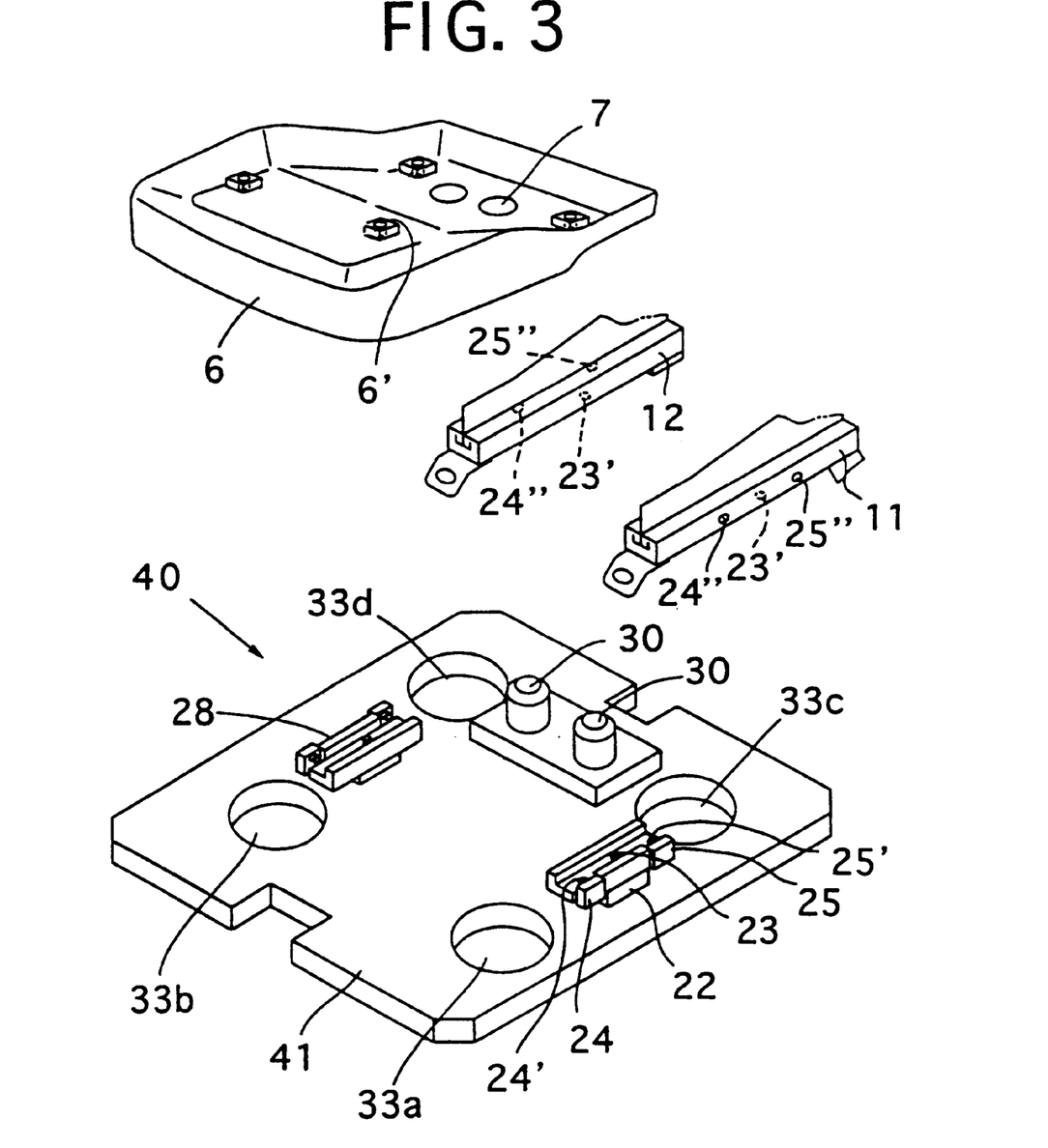
FIG.3 is a perspective view of a jig according to the present invention, and the jig is shown together with a bottom frame and a part of a base frame.

FIG.3 shows a perspective view of the jig. The jig 40 has two holder blocks 22, 28 for holding the lower members 11, 12 of the base frame structure 10. Those holder blocks 22, 28 are mounted on a generally rectangular shaped plate 41. The lower members 11, 12 held by the holder blocks 22, 28 are positioned above the plate 41. That is, there is a distance between the plate 41 and the lower members 11, 12 held by the holder blocks 22, 28. The holder block 22 (as well as the holder block 28) has a U-shaped section having a horizontal wall and vertical walls extended from both sides of the horizontal wall, and the lower member 11 (12) is held on the holder block 22 (28) in parallel to the plate 41. A vertical projection 23 is provided on the center of the horizontal surface of the holder block 22 (28). One of the vertical walls has slide parts 24, 25 which can be slid toward another vertical wall by air-pressure, and horizontal projections 24', 25' are provided on those slide walls 24, 25, respectively, so as to face those projections 24', 25' to another vertical wall.

Meanwhile, holes or hollows 23', 24", 25" corresponding to the projections 23, 24', 25' are provided in the lower member 11. Thus, the lower members are positioned on the holder blocks so as to match the holes or hollows of the lower members to the corresponding projections of the holder blocks, and the slide walls of the holder blocks are then slid by air- pressure, and thereby the lower members 11, 12 are positioned and held on the holder blocks 22, 28. Thus, if the sectional shapes of the lower members and sizes of holes provided in the lower members are standardized, the present jig can be commonly used even though the length of the lower member and the shape of the brackets (11', 12') are changed in accordance with the floor structure.

Projections 30 for positioning the bottom frame 6 are provided in the plate 41, and if the projections 30 of the plate 41 are inserted in the holes 7 of the bottom frame 6', the holes 6 of the bottom frame 6 are positioned on the holes 15', 16' of the brackets 15, 16 of the upper members. Also, openings 33a, 33b, 33c, 33d are provided in the plate 41 so as to locate those openings under the holes 6', 15', 16'. Bolts for connecting the bottom frame 6 to the upper members 13, 14 pass upward through those openings 33a, 33b, 33c, 33d of the plate 41.

Thus, when the lower members 11, 12 are held on the holder blocks 22, 28 and the projections 30 of the plate 41 are inserted in the holes 7 of the bottom frame 6, the holes 6' of the bottom frame 6 are positioned on the holes 15', 16' of the brackets 15, 16 of the upper members. Then, bolts are passed upward through the openings of the plate and are screwed through the holes. Thereby, the bottom frame can be connected to the upper members.

Figure 4:
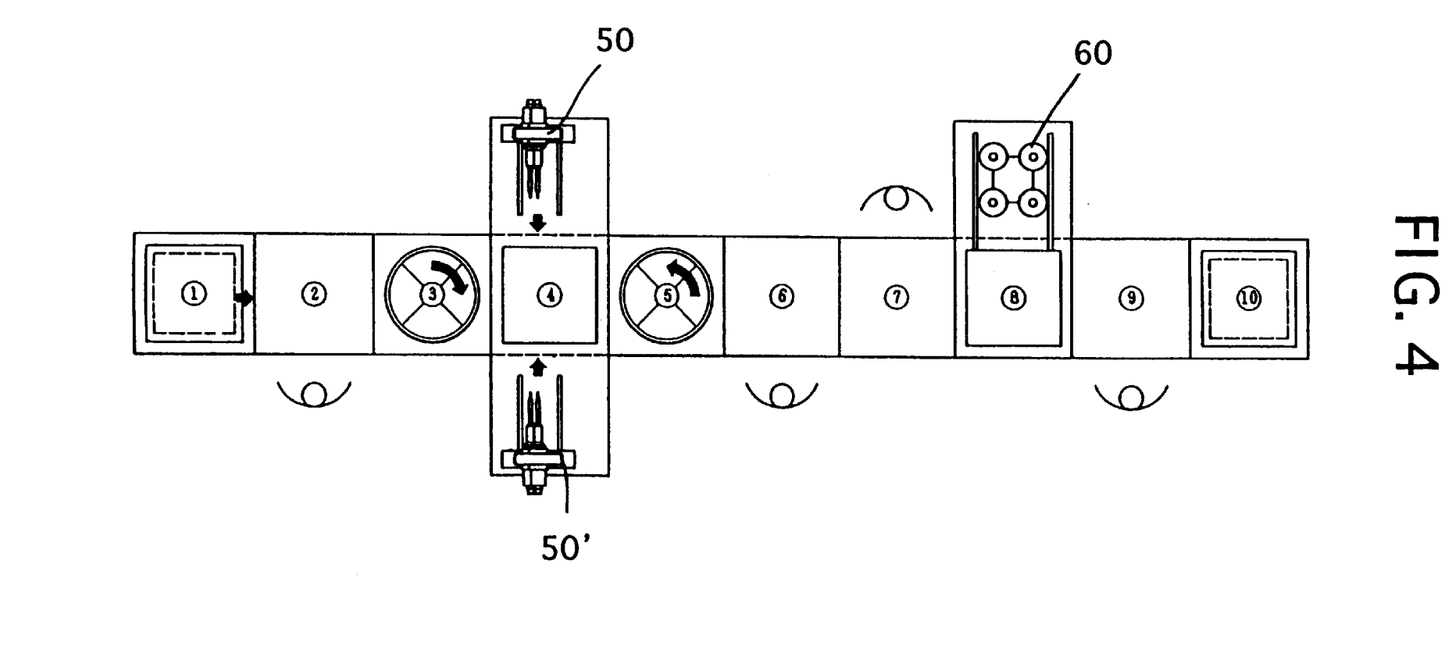
FIG.4 shows a preferred example of a line production system for assembling a seat according to the present invention.

With referring to FIG.4, a preferred process for assembling each frame is described.

A free-flow conveyor type jig-transferring rail extends in a straight line and stations ①-⑩ are provided along the transferring rail. The jig can be slid on the transferring rail from one station to another station.

If the jig reaches on the last station ⑩, then the jig passes under the transferring rail so as to return to the first station ①. By such an arrangement, the working space can be reduced and saved. In FIG. 4, ten assembling stations are shown, but the number of such assembling stations can be changed as occasion demands.

At station ②, as explained above with referring to FIG. 3, the lower members (11, 12) (the upper members (13, 14) have been attached to those lower members (11, 12)) are positioned and held on the holder blocks (22, 28) of the jig. Then, as explained above with referring to FIG. 2, the hook (21") of the disc fixed to the rotating member is hooked on the back frame (1) (a cushion pad has been attached to the back frame) through the entrance (2") thereof, so that the back frame (1) can be temporarily attached to the base frame (10). As described above, the holes (2') are positioned on the holes (20') by only entering the hook through the entrance and receiving the hook on the flange of the base frame.

Figure 5:
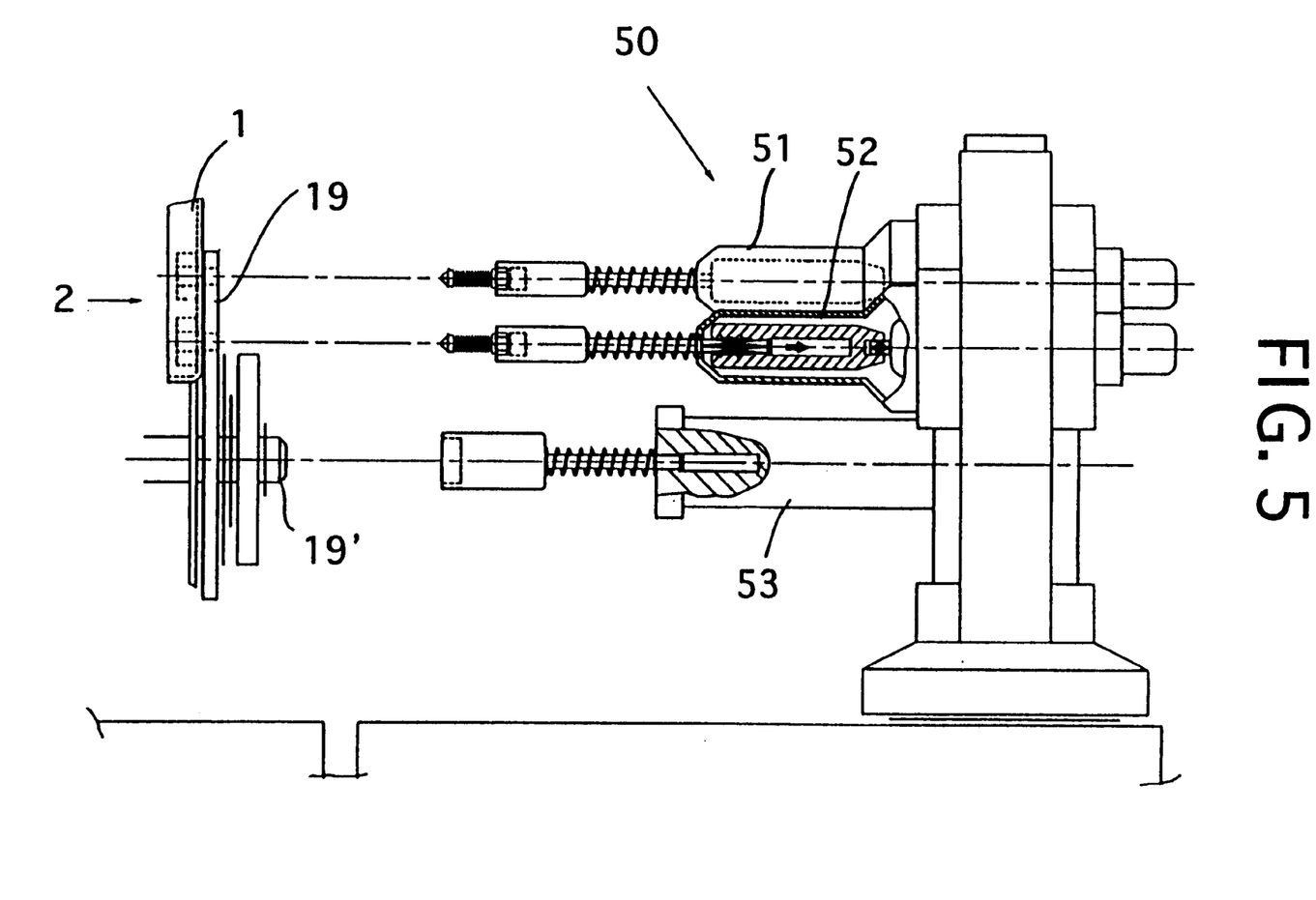
FIG.5 is a partial sectional side view of a screw unit for connecting a back frame to a base frame structure by use of a jig according to the present invention.

Both end portions of the back frame are symmetry each other, and the connecting means provided in both sides of the base frame structure are also symmetry each other. Thus, as shown in FIG. 5, the back frame and the base frame structure can be connected simultaneously at both sides of the back frame and the base frame structure by use of screw units 50, 50' disposed on both sides of the transferring rail. If each end portion of the back frame and each of the connecting means of the base frame structure do not face correctly to the screw units, the jig can be rotated at station ③ so as to face to the correct direction.

The jig is then transferred to station ④, and bolts are screwed to connect the back frame and the base frame structure at station ④. At both sides of station ④, the screw units 50, 50' (those screw units are identical) are disposed as shown in FIG. 4. As shown in FIG. 5, the screw unit 50 has two screwing devises (51, 52) (those screwing devises are identical) for holding bolts and screwing those bolts through the holes of the back frame and the base frame structure into the threaded holes of the nuts fixed on the back frame. A bolt head is held and the bold is screwed by the screwing devise 51. The screwing devise 51 further includes a floating mechanism for pressing the bolt at a constant pressure.

Both screwing devices 51, 52 are positioned at the same level as the holes 2' of the end portion 2 of the back frame 1 so as to position the bolts on the holes 2'. The screw unit 50 further includes a positioning device 53. The positioning devices 53 has a cap which holds an end portion of an axial rod 19' passing through the center of the rotating member attached to the upper member and can be retracted in its axial direction.

The jig is transferred to station ④, and then, while the screw units 50, 50' are approaching to the back frame and the base frame structure, the positioning device 53 holds the end portion of the axial rod 19' so as to position the back frame and the base frame structure. When the screw units 50, 50' are further approaching to the back frame and the base frame structure, two bolts held on each screwing device 51, 52 are inserted and screwed into the threaded holes of the back frame through the holes of both of the back frame and the rotating member of the base frame structure. Note that the holes of the rotating member have been positioned on the holes of the back frame, as described above. The floating mechanism of each screwing device always presses the bolts into the holes, and the bolts are screwed until a predetermined torque is produced. As a result, the back frame 1 is connected to the base frame structure 10 by use of the screw units.

After the back frame is connected to the base frame structure, the jig is transferred to station ⑤ and is rotated so as to return to its original direction. At station ⑤, as described above with referring to FIG. 3, the bottom frame 6 (a cushion pad has been attached to this bottom frame) is positioned on the base frame structure 10. Note that the cushion pad hides the holes 7' of the bottom frame so that the holes 7' can not be seen by the working person, but the positioning of the bottom frame is easily done by the projections 30 of the jig. When the projections 30 of the jig is inserted in the holes 7, the holes 6' of the bottom frame are positioned on the holes 15', 16' of the brackets 15 of the upper members (see FIG. 6). Then, the jig is transferred to station ⑧ to connect the bottom frame to the upper members.

Figure 6:
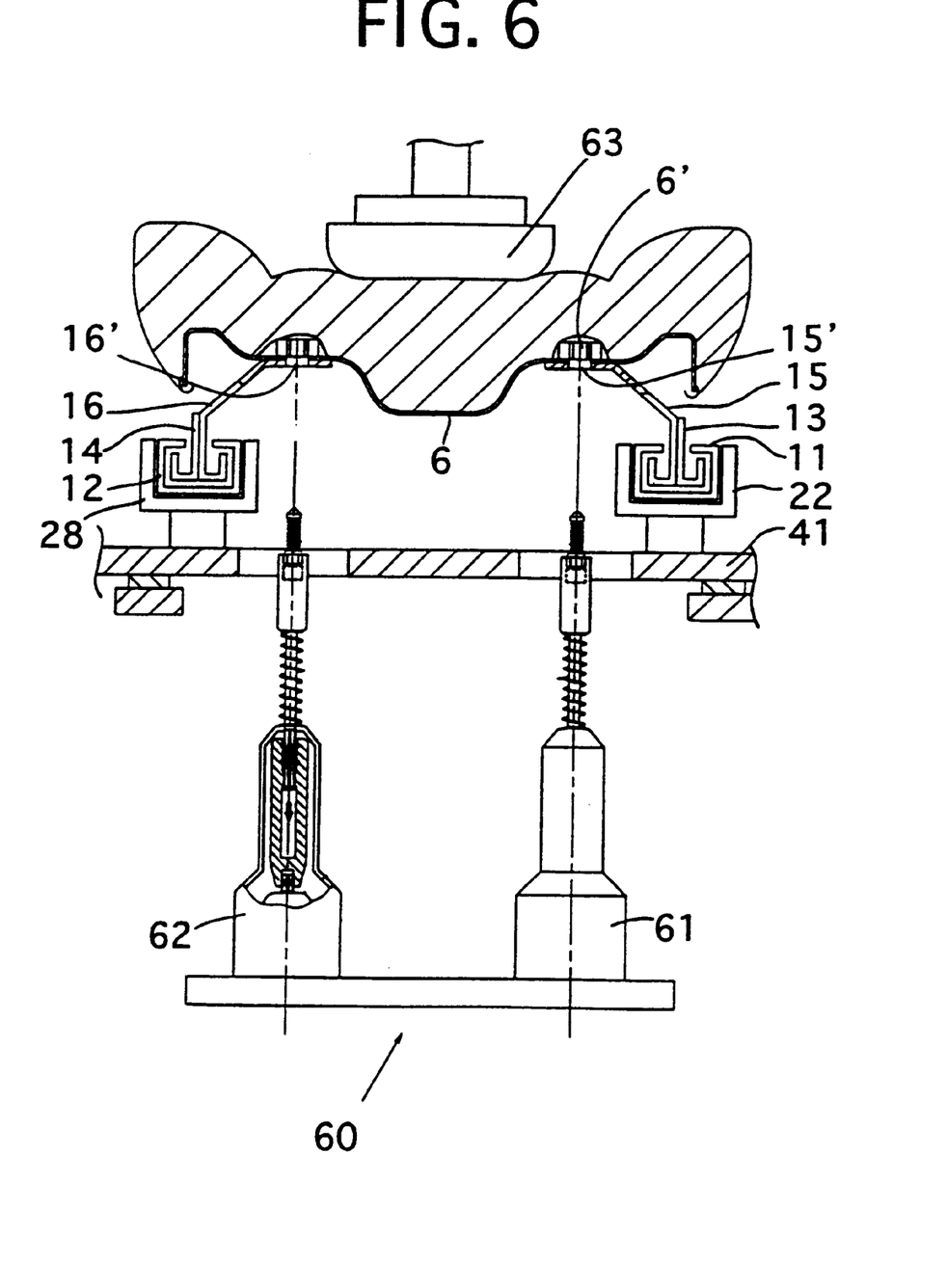
FIG. 6 is a sectional front view of an arrangement of a bottom frame, a base frame structure, a jig and a screw unit when the bottom frame is connected to the base frame structure.

At station ⑧, a screw unit 60 is disposed. This screw unit 60 can be slid under the jig (see FIGS.4 and 6). As shown in FIG. 6, the screw unit 60 has screwing devices. The number of the screwing devices are corresponding to the number of the holes (6', 15', 16'), and four screwing devices (in FIG. 6, only two screwing devices (61,62) are shown) can be positioned under the holes (6', 15', 16'). Those screwing devices have substantially the same structure as the screwing devices 51, 52 described above with referring to FIG. 5.

At station ⑧, since the holes (6') of the bottom frame 6 are positioned on the holes (15', 16') of the upper members 13, 14 held on the jig as shown in FIG. 6, the bottom frame is connected to the upper members by lifting upward the screwing devices (61, 62) and screwing bolts through the holes into the threaded holes of the nuts fixed on the bottom frame. When this, a pressure is applied on the cushion pad by use of a weight 63, so that the bottom frame is not lifted upward.

As described above, the jig is slid on the transferring rail, and thereby, a seat can be assembled.

In a method for manufacturing a reclining seat according to the present invention, since aback frame can be temporarily attached to rotating members of a base frame structure while holes provided in the back frame are positioned on holes provided in the rotating members, the back frame can be connected to the base frame structure by only screwing bolts through those holes. Such a temporary attachment can be done even though a cushion pad is attached to the back frame. Thus, many hands have been required for the connection of each frame in the manufacture of a seat, but such a connection can be done in an automatic line production system in accordance with the present invention. Thereby, not only the quality of every product becomes stable and constant, but also the number of the steps of manufacturing and the manufacturing cost are reduced.

Moreover, since a jig according to the present invention can be used for a seat having a base frame structure difficult to standardize, not only it becomes unnecessary to provide a variety of jig corresponding to a seat having a variety of frames, but also it becomes unnecessary to change a jig-transferring rail so as to correspond to a jig. Thus, by use of a jig according to the present invention, a variety of seats can be manufactured without changing a line for manufacturing a seat.

What is claimed is:

1. A method for assembling a seat having a back frame and a bottom frame both attached to a base frame by use of a jig, comprising the steps of:

holding base frame on a frame holding means of a jig, said jig being able to slide on a free flow conveyer type jig-transferring rail;

entering and receiving a hook of a rotating member of said base frame in an entrance provided in an end portion of said back frame to which a cushion pad has been attached, so that said back frame is temporarily attached to said base frame, and positioning said end portion of said back frame to a connecting means of said base frame;

sliding said jig on said jig-transferring rail together with said back frame and said base frame to a position at which first frame connecting means are disposed;

approaching said first frame connecting means to said end portion and said connecting means, and connecting said back frame to said base frame by use of said first frame connecting means;

sliding said jig on said jig-transferring rail together with said back frame and said base frame;

positioning said bottom frame on said base frame, a cushion pad having been attached to said bottom frame;

sliding said jig together with said back frame, said bottom frame and said base frame to a position at which second frame connecting means are disposed; and lifting upward and approaching said second connecting means to a connecting position of said base frame and said bottom frame through an opening of said jig, and connecting said bottom frame to said base frame.

2. A method of claim 1 wherein said jig returns to its first position by passing under said jig-transferring rail after said seat is assembled.

3. A method of claim 1 wherein when said bottom frame is connected to said base frame, said bottom frame is pressed downward.

4. A method of claim 1 wherein at least one of said steps is carried out in an assembling station.

* * * * *